United States Patent
Jaśkiewicz

(10) Patent No.: US 11,408,443 B2
(45) Date of Patent: Aug. 9, 2022

(54) SERVOVALVE

(71) Applicant: Hamilton Sundstrand Corporation, Charlotte, NC (US)

(72) Inventor: Zbigniew Jaśkiewicz, Wroclaw (PL)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 263 days.

(21) Appl. No.: 16/512,764

(22) Filed: Jul. 16, 2019

(65) Prior Publication Data

US 2020/0096011 A1   Mar. 26, 2020

(30) Foreign Application Priority Data

Sep. 21, 2018   (EP) .................................. 18461608

(51) Int. Cl.
| F15B 13/04 | (2006.01) |
| F15B 9/07 | (2006.01) |
| F15B 13/043 | (2006.01) |
| F15B 13/044 | (2006.01) |

(52) U.S. Cl.
CPC ............ *F15B 9/07* (2013.01); *F15B 13/0402* (2013.01); *F15B 13/0436* (2013.01); *F15B 13/0444* (2013.01); *F15B 2211/327* (2013.01); *F15B 2211/40538* (2013.01)

(58) Field of Classification Search
CPC .............. F15B 13/0402; F15B 13/0436; F15B 13/0444; F15B 2211/327; F15B 2211/40538
See application file for complete search history.

(56) References Cited

U.S. PATENT DOCUMENTS

| 3,211,182 A | 10/1965 | Gyurik et al. |
| 3,919,923 A | 11/1975 | Haigh |
| 4,046,061 A | 9/1977 | Stokes |
| 4,235,156 A | 11/1980 | Olsen |
| 4,333,498 A | 6/1982 | Huling |
| 4,630,631 A | 12/1986 | Barnes |

(Continued)

FOREIGN PATENT DOCUMENTS

| EP | 3321513 A1 | 5/2018 |
| GB | 2070804 A | 9/1981 |
| GB | 2104249 A | 3/1983 |

OTHER PUBLICATIONS

Extended European Search Report for International Application No. 18461608.4 dated Apr. 4, 2019, 9 pages.

*Primary Examiner* — P. Macade Nichols
(74) *Attorney, Agent, or Firm* — Cantor Colburn LLP

(57) ABSTRACT

A servovalve includes a supply port and a control port; a moveable valve spool arranged to regulate flow of fluid from the supply port to the control port in response to a control signal and a drive assembly configured to axially move the valve spool relative to the fluid transfer assembly in response to the control signal to regulate the fluid flow; wherein the drive assembly comprises a first fluid channel providing a flow path for fluid from the supply port to a first end of the spool and provided with a first flow control orifice. The assembly also includes a second fluid channel providing a rotating element provided with a cam profile located between the first flow control orifice and the second flow control orifice. The assembly also includes drive means arranged to rotate the rotating element.

9 Claims, 3 Drawing Sheets

(56) References Cited

U.S. PATENT DOCUMENTS

| | | |
|---|---|---|
| 6,199,588 B1 * | 3/2001 | Shapiro ............... F15B 13/0444 |
| | | 137/625.65 |
| 6,786,238 B2 | 9/2004 | Frisch |
| 7,066,189 B2 | 6/2006 | Tranovich et al. |
| 7,926,512 B2 | 4/2011 | Spickard et al. |
| 7,963,185 B2 | 6/2011 | Spickard |
| 9,309,900 B2 | 4/2016 | Kopp |
| 2015/0047729 A1 | 2/2015 | Kopp et al. |
| 2018/0038503 A1 | 2/2018 | Spickard et al. |

* cited by examiner

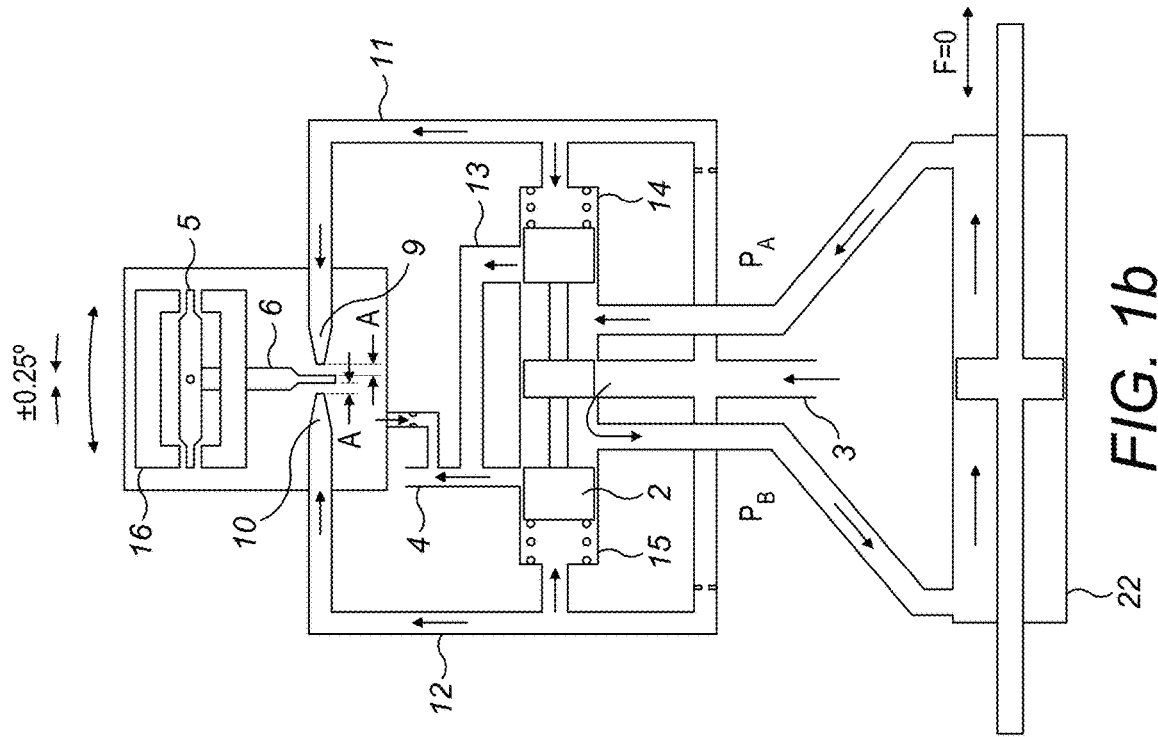
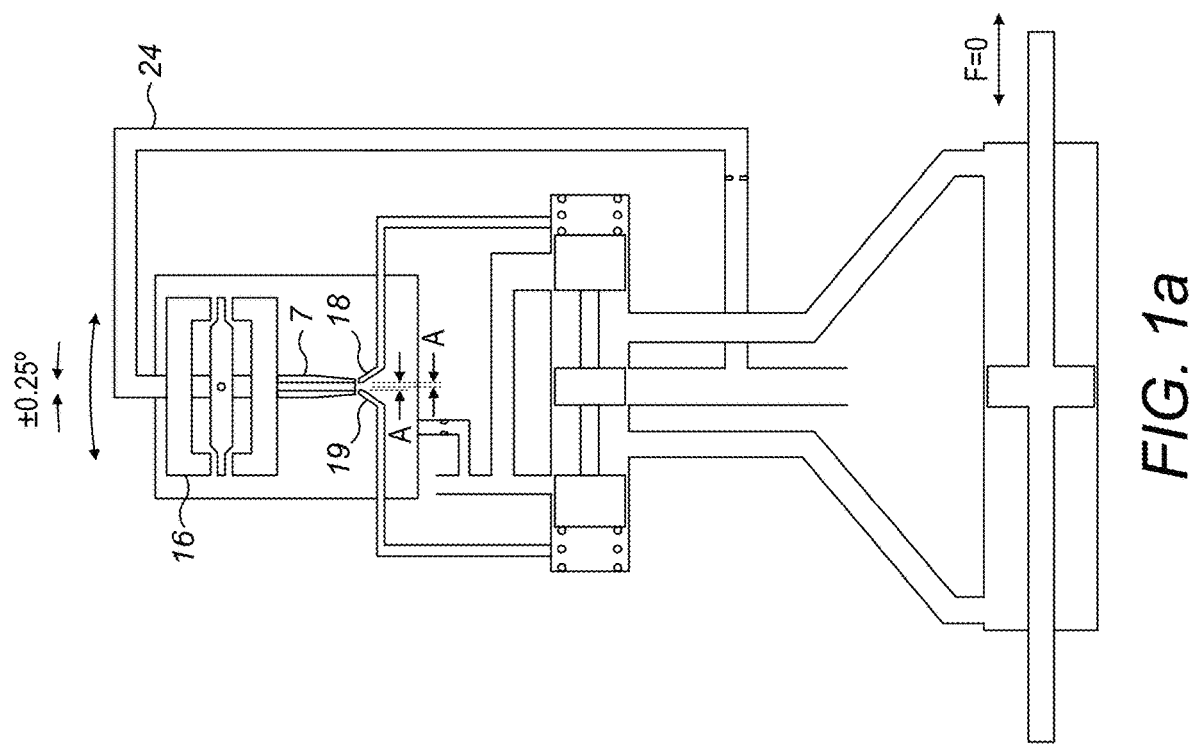
FIG. 1a
FIG. 1b

SERVOVALVE

FOREIGN PRIORITY

This application claims priority to European Patent Application No. 18461608.4 filed Sep. 21, 2018, the entire contents of which is incorporated herein by reference.

TECHNICAL FIELD

The present disclosure relates to servovalves used to transfer quantities of, or manage the flow of fluid e.g. air.

BACKGROUND

Servovalves find a wide range of applications for controlling air or other fluid flow to effect driving or control of another part e.g. an actuator.

A servovalve assembly includes a drive assembly e.g. a motor controlled by a control current which controls flow to a valve e.g. an air valve to control an actuator. Generally, a servovalve transforms an input control signal into movement of an actuator cylinder. The actuator controls e.g. an air valve. In other words, a servovalve acts as a controller, which commands the actuator, which changes the position of an air valve's flow modulating feature.

Such mechanisms are used, for example, in various parts of aircraft where the management of fluid/air flow is required, such as in engine bleeding systems, anti-ice systems, air conditioning systems and cabin pressure systems. Servovalves are widely used to control the flow and pressure of pneumatic and hydraulic fluids to an actuator, and in applications where accurate position or flow rate control is required. Some examples of applications are aircraft, automotive systems and in the space industry.

Conventionally, servovalve systems operate by obtaining pressurised fluid from a high pressure source which is transmitted through a load from which the fluid is output as a control fluid. Various types of servovalves are known—see e.g. GB 2104249, US 2015/0047729 and U.S. Pat. No. 9,309,900.

Electrohydraulic servovalves can have a first stage with a motor, e.g. an electrical or electromagnetic force motor or torque motor, controlling flow of a hydraulic fluid to drive a valve member e.g. a spool valve of a second stage, which, in turn, can control flow of hydraulic fluid to an actuator for driving a load. The motor can operate to position a moveable member, such as a flapper, in response to an input drive signal or control current, to drive the second stage valve member e.g. a spool valve.

Such conventional systems will be described in more detail below with reference to FIGS. 1a and 1b.

Particularly in aircraft applications, but also in other applications, servovalves are often required to operate at various pressures and temperatures. For e.g. fast acting air valve actuators, relatively large flows are required depending on the size of the actuator and the valve slew rate. For such high flow rates, however, large valve orifice areas are required. For 'flapper' type servovalves, problems arise when dealing with large flows due to the fact that flow force acts in the direction of the flapper movement and the motor is forced to overcome the flow forces. For clevis-like metering valves such as described in U.S. Pat. Nos. 4,046,061 and 6,786,238, the flow forces, proportional to the flow, act simultaneously in opposite directions so that the clevis is balanced and centered. The clevis, however, needs to be big due to the requirement for bigger orifices to handle larger flows.

Jet pipe servovalves provide an alternative to 'flapper'-type servovalves. Jet pipe servovalves are usually larger than flapper type servovalves but are less sensitive to contamination. In jet pipe systems, fluid is provided via a jet pipe to a nozzle which directs a stream of fluid at a receiver. When the nozzle is centered—i.e. no current from the motor causes it to turn, the receiver is hit by the stream of fluid from the nozzle at the centre so that the fluid is directed to both ends of the spool equally. If the motor causes the nozzle to turn, the stream of fluid from the nozzle impinges more on one side of the receiver and thus on one side of the spool more than the other causing the spool to shift. The spool shifts until the spring force of a feedback spring produces a torque equal to the motor torque. At this point, the nozzle is centred again, pressure is equal on both sides of the receiver and the spool is held in the centered position. A change in motor current moves the spool to a new position corresponding to the applied current.

Such systems will be described further below with reference to FIG. 1a.

As mentioned above, jet pipe servovalves are advantageous in that they are less sensitive to contamination e.g. in the supply fluid or from the valve environment. These valves are, however, more complex and bulkier. Additional joints are required for the fluid supply pipe, and the supply pipe from the fluid supply to the jet pipe is mounted outside of the servovalve body in the torque motor chamber. In the event of damage to the pipe, this can result in external leakage. The pipe, being external, adds to the overall size and is more vulnerable to damage.

European Patent Application 16461572 teaches a jet-pipe type servovalve wherein fluid is provided to the nozzle via a connector header in fluid communication with the interior of the spool, the spool being provided with one or more openings via which fluid from the supply port enters the interior of the spool and flows into the connector header and to the nozzle.

The servovalve includes drive means for steering the nozzle in response to the control signal. The drive means may include a motor such as a torque motor arranged to steer the nozzle by means of an induced current. Other drive means may be used to vary the position of the nozzle. The drive means may be mounted in a housing attached to the valve assembly.

The arrangement of EP 16461572 enables the conventional outside supply pipe to be removed and allows the jet pipe to be fed with fluid via the spool and a feedback spring.

Conventional servovalves, however, consume a relatively large amount of electrical power and cannot provide a very effective variable control of fluid flow.

There is a need for improved servovalve arrangements that can handle large fluid flows effectively and at high operation frequency, but with lower power consumption, and enabling variable control, whilst retaining a compact design and being less vulnerable to contamination, damage and leakage.

The present disclosure provides a servovalve as claimed in claim 1.

In more detail, preferably the drive stage assembly comprises: a first fluid flow branch in the first fluid flow channel between the supply port and the first orifice to branch off fluid to the first end of the valve spool; a second fluid flow branch in the second channel between the supply port and the second orifice to branch off fluid to the second end of the valve spool; the rotating element rotatably located between the first orifice and the second orifice, the cam member having a cam profile such that rotation of the cam member relative to the first and second orifices varies the fluid flow from the respective orifice, which correspondingly varies the fluid flow to the respective end of the valve spool; and the drive means arranged to drive rotation of the cam member according to the control signal.

The fluid transfer valve assembly may further comprise a positioning mechanism at the ends of the valve spool, e.g. a torsion spring at each of the respective ends of the valve spool or some other mechanical or electrical position feedback arrangement.

The valve spool may be moveably mounted in a cylindrical housing, having an end cap at each end.

Also provided is a method of driving a valve spool of a servovalve comprising varying the fluid flow acting on respective ends of the valve spool via a fluid flow path by changing the size of respective first and second orifices of the flow path by means of a rotatable cam member between the orifices, wherein rotation of the cam member relative to the first and second orifices, in response to a control signal, varies the fluid flow from the respective orifice, which correspondingly varies the fluid flow to the respective end of the valve spool.

Preferred embodiments will now be described with reference to the drawings.

BRIEF DESCRIPTION OF THE DRAWINGS

FIG. 1a is a schematic view of a conventional jet-pipe type servovalve;

FIG. 1b is a schematic view of a conventional flapper type servovalve;

DETAILED DESCRIPTION

Figure 2:
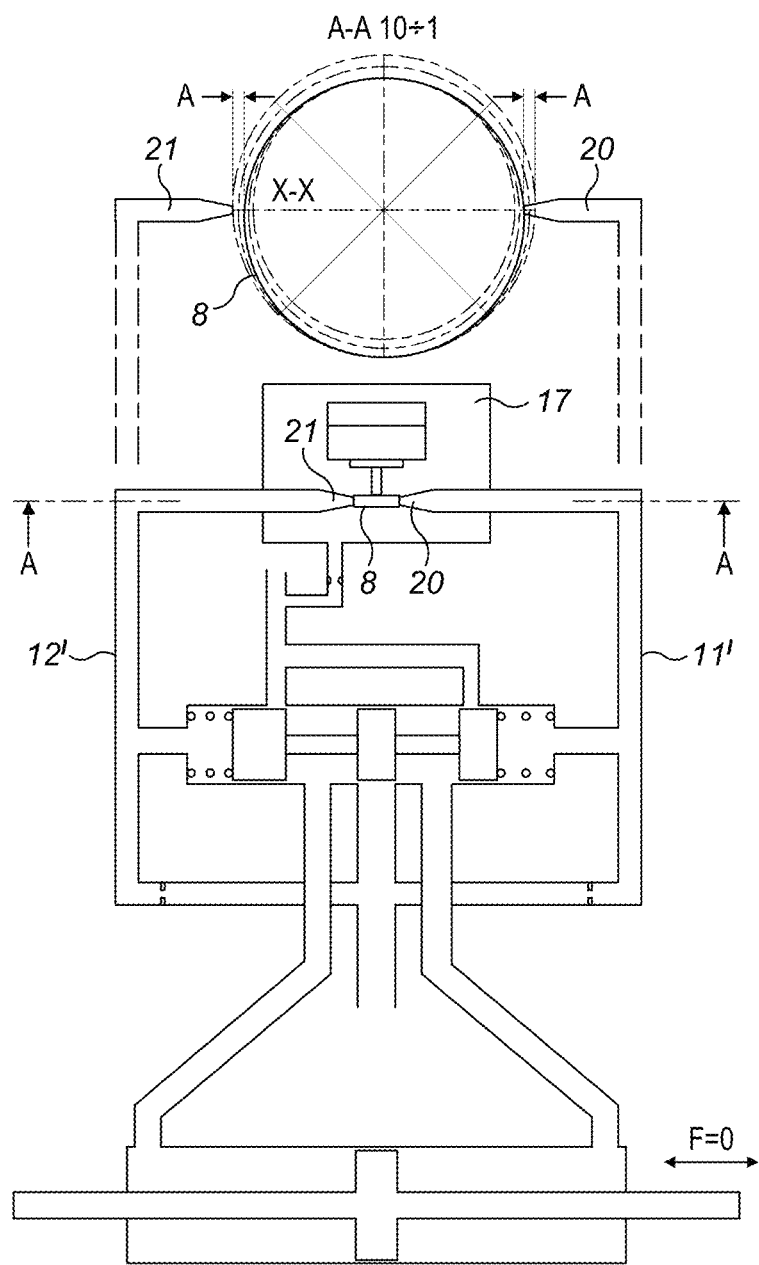
FIG. 2 is a schematic view of a servovalve according to the present disclosure.

A servovalve as described below can, for example, be used in an actuator control system. The servovalve is controlled by a drive assembly to control a flow of fluid that is output to control the movement of an actuator. The actuator can control e.g. ailerons or elevator flaps of an aircraft.

Conventional jet pipe and flapper servovalves will first be described with reference to FIGS. 1a and 1b.

A typical flapper servovalve is shown in FIG. 1b. The assembly comprises a first stage comprising the drive assembly, and a second stage comprising a spool assembly. FIG. 1b also shows, at the bottom, the actuator 22 controlled by the servovalve. Operation of the valve comprises causing the spool 2 to move to the left and/or right by distance A so as to align ports in the spool 2 with fluid channels to control the flow of fluid through the valve and out of a control port to control the actuator or other moveable part. The spool is part of a spool assembly having: supply ports, control ports, and a return port 4. Flow is possible between the ports $P_A$, $P_B$ via a passage through the spool. The movement of the spool 2 is caused by the pressure of the hydraulic fluid (here oil supplied to the assembly from an oil reservoir or supply (not shown) via orifices but it can be any hydraulic fluid) acting on one or other of the ends of the spool 2 via channels 11, 12. As shown by the arrows, fluid flow is from supply channel 3 into the body of the spool 2. Fluid is also diverted from the supply channel 3 into the channels 11 and 12, and further to the orifices 9, 10 to create a pressure imbalance to control movement of the spool 2. In a balanced state, the fluid pressure in channels 11 and 12 is essentially equal. Some fluid (the same at each end) acts on the ends of the spool and the rest of the fluid in channels 11 and 12 exits via the orifices 9 and 10 where it is returned to the supply. The pressure at the respective ends is varied in accordance with a control signal applied to the drive assembly selected according to the desired output from the valve. The hydraulic fluid is returned to the supply via a channel 13.

Therefore, when the control signal is such as to cause the drive assembly to apply greater fluid pressure to one end of the spool, by diverting more fluid to that end via channel 12, as compared to channel 11, the spool 2 will move to the right. If greater fluid pressure is applied via channel 11, the spool 2 will move to the left. In the flapper arrangement, shown, the control signal is applied to a torque motor 16 and armature 5 which causes a flapper-type drive member 6 to deflect left or right. The flapper 6 is positioned between orifices 9, 10 at the ends of channels 11, 12 respectively. If the control signal, via armature 5, causes the flapper 6 to move to the left thus closing off orifice 10 of channel 12, then essentially all of the hydraulic fluid in channel 12, will be directed to the end of the spool as it can no longer exit orifice 10, thus increasing the pressure at the left end of the spool 2 and causing the spool to move to the right. If the control signal is such as to cause the flapper 6 to move to the right, closing orifice 9 of channel 11, then more pressure is provided to the other end of the spool 2 via channel 11, causing the spool 2 to move to the left.

A positioning mechanism may be provided at the ends of the valve spool, e.g. a torsion spring 14, 15 at each of the respective ends of the valve spool or some other mechanical or electrical position feedback arrangement.

The principles of operation are similar for the jet-pipe type assembly, but instead of the drive member being a flapper 6 that moves to close off a respective channel, the drive member is a pipe 7 with a nozzle which is deflected left or right responsive to the control signal and from which fluid is ejected to either the left or the right end of the spool.

In a conventional jet-pipe type assembly, as shown in FIG. 1a, the arrangement comprises a servovalve assembly having a torque motor 16 and a moveable spool, mounted in a supporting block, or mounted in a cylinder mounted in a block. The spool is, as for the flapper type arrangement, part of a spool assembly having: supply ports, control ports, and a return port. Flow is possible between the ports via a passage through the spool. The torque motor provides current that causes a jet pipe 7 to turn at its end closest to the spool, which end terminates in a nozzle. Supply fluid is provided from the supply port, via a supply pipe 24 to the top of the jet pipe—i.e. the end opposite the end with the nozzle, and the supply fluid flows through the jet pipe and out of the nozzle. A receiver is provided in the block below the nozzle. The receiver provides two channels 18, 19 via which fluid from the nozzle flows into the spool. When no current is applied by the motor to the jet pipe, the nozzle is centered relative to the receiver and supply fluid exiting the nozzle flows equally through both channels and thus equally to both ends of the spool. The spool therefore remains centered—i.e. 'closed' so that no fluid flows through the control ports. When actuator control is desired, the motor provides a control current to the jet pipe causing the nozzle to turn away from the centered position. The fluid supplied through the nozzle then flows predominantly through one receiver channel as compared to the other channel. More fluid flows, therefore, into the corresponding end of the spool causing axial movement of the spool. This either blocks/occludes the passage between the supply port and the respective control port or opens the passage to allow flow between the two ports, depending on the axial position of the spool due to the position of the nozzle, thus modulating pressure on the control ports and controlling the actuator. A supply pipe is also connected to the supply port and routes supply fluid external to the spool and into the top end of the jet pipe. The supply fluid flows down the jet pipe to the nozzle and exits to the receiver described above. The jet pipe is preferably mounted in a flexural tube. While the nozzle is centered, equal amounts of fluid go to the two ends of the spool.

In an example, the assembly is arranged to control an actuator based on the fluid flow from the control port e.g. via a butterfly valve. The servovalve controls an actuator which, in turn, controls an air valve such as a butterfly valve.

Supply pressure is provided to the servovalve housing via the supply port and to the spool via spool supply ports. The pressure at the return port is a return pressure which will vary depending e.g. on the altitude of the aircraft in flight. Control ports provide a controlled pressure, dependant on the nozzle/flapper position and resulting spool position, to be provided to an actuator.

The spool is in the form of a tubular member arranged in a valve block (not shown) to be moved axially by the hydraulic fluid.

In more detail, both in the conventional flapper or jet-pipe type assemblies, to open the servovalve, control current is provided to coils of the motor (e.g. a torque motor) creating electromagnetic torque opposing the sum of mechanical and magnetic torque already 'present' in the torque motor. The bigger the electromagnetic force from the coils, the more the jet pipe nozzle turns or the flapper pivots. The more it turns/pivots, the greater the linear or axial movement of the spool. A torque motor usually consists of coil windings, a ferromagnetic armature, permanent magnets and a mechanical spring (e.g. two torsional bridge shafts). This arrangement provides movement of the nozzle/flapper proportional to the input control current.

Jet-pipe arrangements can operate at high frequency but only for average pressure levels. In contrast, the flapper arrangements can operate at higher pressures but at lower frequency.

One problem that has been identified with these conventional systems is that when the drive member (flapper or nozzle) is in an extreme left or right position there is some deformation to the directional characteristics due to oil pressure acting on the flapper or by the resilience of the bending jet pipe. Also, a smooth variable control of the actuator is difficult to achieve.

Figure 3:
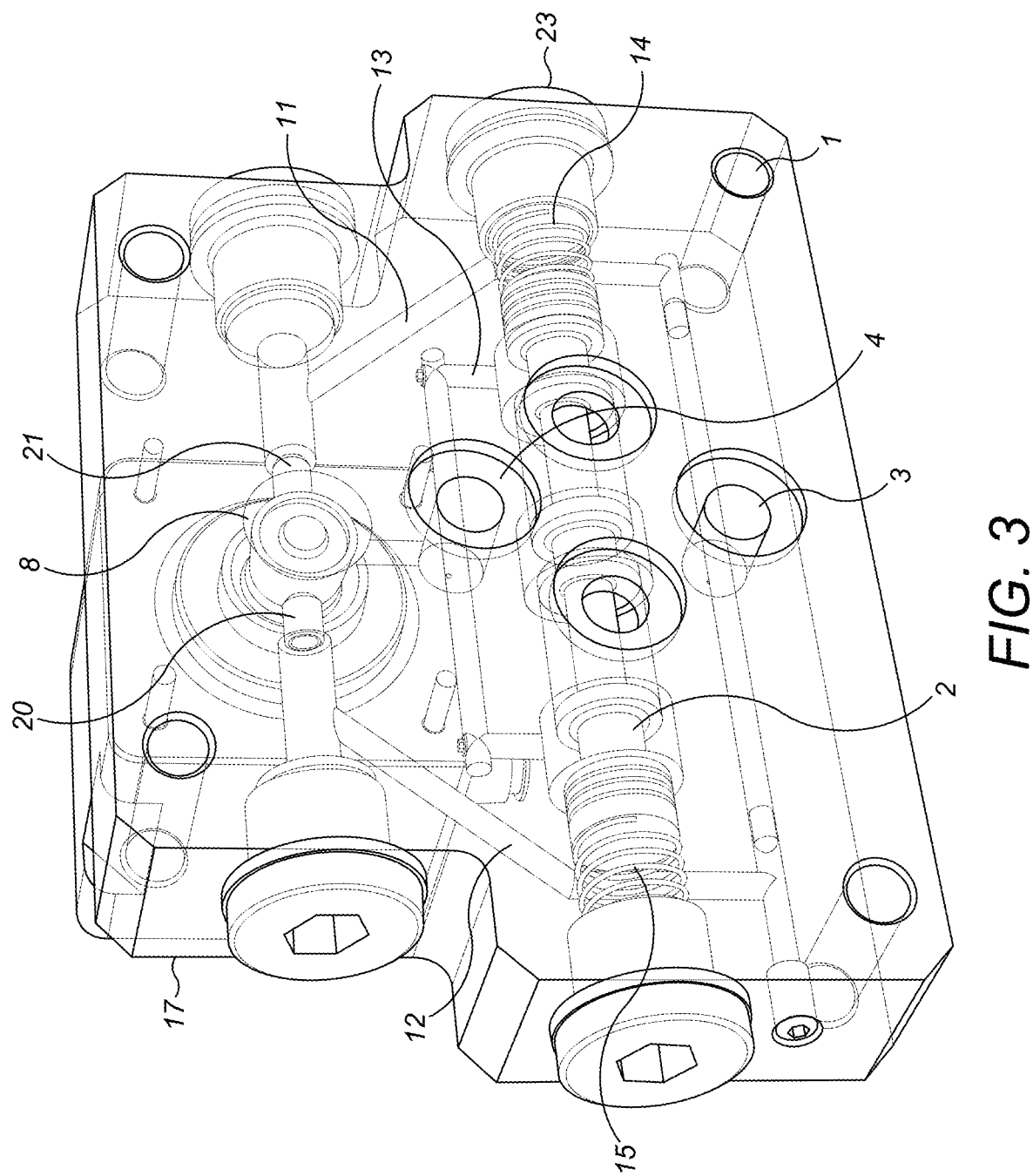
FIG. 3 shows a perspective view of one embodiment of a servovalve assembly according to this disclosure.

As can be seen from FIGS. 2 and 3, the arrangement of the present disclosure starts from an assembly such as the flapper assembly of FIG. 1b, but replaces the flapper and its drive assembly with a nozzle cam assembly, described further below, positioned between channels 11' and 12', the assembly being activated, responsive to a control signal, to open or close orifices 20,21 (which correspond essential to orifices 9 and 10 in the prior art, and, in some examples, to vary the degree of opening or closing of those orifices to control fluid flow through the system. The top part of FIG. 2, in dashed lines, is an expanded view of the flow control part shown in situ directly below. The spool, actuator and ports are the same as for the prior art arrangements described above and will not, therefore, be described again in any detail. FIG. 3 shows a perspective view of the assembly shown in FIG. 2. Plugs 23 may be provided at the ends of the spool to secure the spool in the housing.

Instead of a flapper or jet pipe that pivots between the two orifices depending on the control signal, the system of the present disclosure controls fluid flow to the spool ends by means of a rotating element 8 provided with an outer surface having a cam profile, located between the two orifices 20, 21 such that rotation of the element 8, in response to the control signal, causes different parts of the cam profile surface to be disposed adjacent the orifices. Because the outer surface is provided with a cam, depending on the rotational position of the element 8 with respect to the orifices 20, 21, the actual surface of the rotating element will have a varying spacing from the respective orifices, thus varying the opening of the orifice and the fluid flow that can exit the orifice. At some rotational positions, the rotating element surface will, because of the cam, be further away from the respective orifice 20, 21, thus allowing a greater fluid flow through the orifice. In other cases, the surface will be blocking the orifice 20, 21 so preventing fluid flow from that orifice. Different cam forms will allow different spacings and, thus, different fluid flows, in a range between completely open and completely closed.

In an example, if the control signal indicates that the spool 2 should move more to the right (the directions mentioned are with reference to FIG. 2), orifice 21 of channel 12' should be blocked so that fluid in channel 12' is predominantly directed to the spool end to force the spool to the right. Thus, the part of the cam surface of the rotating element that extends most radially outwards should lie adjacent port 21. If the control signal indicates that the spool 2 should move to the left, orifice 20 of channel 11' should be blocked, then the wider part of the cam surface should be positioned to lie adjacent orifice 20 of channel 11'. The cam surface can be configured to have various radial extensions around the circumference to allow for varying degrees of closure of the orifices.

In one example the rotating element 8 is provided with two cams arranged such that the element can rotate +/−90 degrees to provide the opening and closing of the orifices 20, 21. In alternative embodiments, the cams could be provided e.g. at 30 degree spacing around the element surface so the element can be rotated +/−30 degrees.

Also, a set of rotating elements with different cam forms can be provided and fitted into the servovalve as required for any particular application. It may be, for example, that ailerons can be more optimally controlled with one cam form and elevator flaps can be controlled better with a different cam form.

As the movement of the element 8 is rotational, in response to the control signal, it is driven by a rotary motor rather than a torque motor. The drive motor 17 may be e.g. a stepper motor (with or without an encoder) or a brushless DC motor (BLDC) with encoder. Alternative drives could also be used or the element could be manually controlled. The rotating element can be integrally formed with a shaft of the motor or can be connected to or mounted on the motor shaft.

The rest of the operation of the spool assembly is analogous to that of the flapper and jet-pipe arrangements.

The servovalve arrangement of the disclosure operates in a manner comparable to existing assemblies but has lower power consumption and also allows for a more variable control or can be easily adapted to special control applications. Further, the direction of flow can be easily changed by the rotating element itself, without needing to change polarity of the power supply.

Although this disclosure has been described in terms of preferred examples, it should be understood that these examples are illustrative only and modifications and alterations are possible within the scope of the claims.

The invention claimed is:

1. A fluid transfer valve assembly comprising a supply port and a control port ($P_A$, $P_B$);
    a moveable valve spool arranged to regulate flow of fluid from the supply port to the control port in response to a control signal; and
    a drive assembly configured to axially move the valve spool relative to the fluid transfer assembly in response to the control signal to regulate the fluid flow;
    wherein the drive assembly comprises:
        a first fluid channel providing a flow path for fluid from the supply port to a first end of the spool and provided with a first flow control orifice;
        a second fluid channel providing a flow path for fluid from the supply port to a second end of the spool and provided with a second flow control orifice;
        a rotating element provided with a cam profile, located between the first flow control orifice and the second flow control orifice; and
        drive means arranged to rotate the rotating element to vary the rotational position of the cam profile with respect to the first and second flow control orifice, in response to the control signal, to control flow from the first and second flow control orifices and thus to control movement of the valve spool;
        wherein the cam profile comprises at least one cam;
        wherein the cam profile comprises two cams spaced apart by between 0 and 180 degrees relative to each other around the rotating element.

2. The fluid transfer valve assembly of claim 1, further comprising position determining means at the first and second ends of the valve spool.

3. The fluid transfer valve assembly of claim 2, wherein the position determining means comprises a torsion spring at each of the respective ends of the valve spool.

4. The fluid transfer valve assembly of claim 2, wherein the position determining means comprises mechanical feedback means.

5. The fluid transfer valve assembly of claim 2, wherein the position determining means comprises electrical feedback means.

6. The fluid transfer valve assembly of claim 1, wherein the valve spool is moveably mounted in a cylindrical housing.

7. The fluid transfer valve assembly of claim 1, wherein the drive means comprises a motor.

8. The fluid transfer valve assembly of claim 7, wherein the motor is a stepper motor.

9. The fluid transfer valve assembly of claim 7, wherein the motor is a DC or AC electric motor.

* * * * *